(12) United States Patent
Conforti

(10) Patent No.: US 8,517,065 B2
(45) Date of Patent: Aug. 27, 2013

(54) FILLING APPARATUS

(75) Inventor: Lucio Conforti, Fornovo Taro (IT)

(73) Assignee: Sidel Holdings & Technology S.A. (CH)

( * ) Notice: Subject to any disclaimer, the term of this patent is extended or adjusted under 35 U.S.C. 154(b) by 986 days.

(21) Appl. No.: 12/523,744

(22) PCT Filed: Jan. 23, 2007

(86) PCT No.: PCT/EP2007/050629
§ 371 (c)(1),
(2), (4) Date: Oct. 15, 2009

(87) PCT Pub. No.: WO2008/089843
PCT Pub. Date: Jul. 31, 2008

(65) Prior Publication Data
US 2010/0126624 A1     May 27, 2010

(51) Int. Cl.
*B65B 3/04* (2006.01)

(52) U.S. Cl.
USPC .............................. 141/146; 141/372; 141/392

(58) Field of Classification Search
USPC ........................... 141/144–146, 370–372, 392
See application file for complete search history.

(56) References Cited

U.S. PATENT DOCUMENTS

| | | | |
|---|---|---|---|
| 2,564,938 A | | 8/1951 | Warren |
| 3,475,039 A | | 10/1969 | Ortloff |
| 3,779,293 A | * | 12/1973 | Kaiser .............................. 141/39 |
| 3,780,912 A | * | 12/1973 | Sanz .............................. 222/282 |
| 3,830,265 A | | 8/1974 | Matejek |
| 3,946,770 A | * | 3/1976 | Trinne et al. ...................... 141/5 |
| 4,035,004 A | * | 7/1977 | Hengesbach .............. 285/146.1 |
| 4,369,820 A | * | 1/1983 | Ahlers et al. ..................... 141/39 |
| 4,381,871 A | * | 5/1983 | Dopyera et al. .............. 285/261 |
| 4,386,635 A | * | 6/1983 | Ahlers et al. ...................... 141/6 |
| 4,509,565 A | * | 4/1985 | Ahlers ............................. 141/39 |
| 4,787,427 A | * | 11/1988 | Bacroix et al. .................. 141/39 |
| 5,000,234 A | * | 3/1991 | Weiss ............................... 141/6 |
| 5,082,033 A | * | 1/1992 | Weiss .............................. 141/39 |
| 5,273,082 A | * | 12/1993 | Paasche et al. ................... 141/6 |
| 5,377,726 A | * | 1/1995 | Clusserath ...................... 141/39 |
| 5,634,500 A | * | 6/1997 | Clusserath et al. ............. 141/48 |
| 5,716,006 A | * | 2/1998 | Lott ............................... 239/318 |
| 6,192,946 B1 | * | 2/2001 | Clusserath ...................... 141/40 |
| 6,463,964 B2 | * | 10/2002 | Clusserath ...................... 141/40 |
| 6,474,368 B2 | * | 11/2002 | Clusserath et al. ............... 141/6 |

(Continued)

FOREIGN PATENT DOCUMENTS

DE     354300     6/1922
DE     413263     5/1925

(Continued)

*Primary Examiner* — Gregory Huson
*Assistant Examiner* — Nicolas A Arnett
(74) *Attorney, Agent, or Firm* — Laubscher & Laubscher, P.C.

(57) ABSTRACT

An apparatus to fill a container includes at least one tank for a fluid product to be delivered and one filling head to deliver the fluid product to the container that is movable towards and away from the container. The apparatus further includes a connecting arrangement interposed between the tank and the filling head to supply the fluid product to the filling head. The connecting arrangement includes a ball-and-socket joint structure which includes a first tubular portion having a spherical body, a second tubular portion in the form of a spherical cavity and a tubular sealing element arranged inside the first tubular portion and the second tubular portion at a zone in which the spherical body and the spherical cavity are mutually engaged.

25 Claims, 3 Drawing Sheets

(56) References Cited

U.S. PATENT DOCUMENTS

| | | | |
|---|---|---|---|
| 6,601,618 B2* | 8/2003 | Tsukano et al. | 141/45 |
| 6,648,025 B2* | 11/2003 | Smith et al. | 141/2 |
| 6,892,771 B2* | 5/2005 | Stocchi | 141/129 |
| 7,237,808 B2* | 7/2007 | Porter | 285/261 |
| 7,647,950 B2* | 1/2010 | Clusserath | 141/56 |
| 7,712,793 B1* | 5/2010 | Garraffa | 285/261 |
| 7,963,305 B2* | 6/2011 | Lupi et al. | 141/258 |
| 8,096,330 B2* | 1/2012 | Mazzon | 141/91 |
| 8,109,299 B2* | 2/2012 | Lupi et al. | 141/48 |
| 8,196,967 B2* | 6/2012 | Seifert et al. | 285/14 |
| 8,256,474 B2* | 9/2012 | Stienen | 141/144 |
| 2002/0179177 A1* | 12/2002 | Tsukano et al. | 141/57 |
| 2003/0192615 A1* | 10/2003 | Smith et al. | 141/2 |

FOREIGN PATENT DOCUMENTS

| | | |
|---|---|---|
| DE | 924011 | 2/1955 |
| GB | 1324334 | 7/1973 |
| GB | 1351521 | 5/1974 |

* cited by examiner

FILLING APPARATUS

This application is a continuation of PCT International Application No. PCT/EP2007/050629 filed Jan. 23, 2007.

BACKGROUND OF THE INVENTION

The invention relates to a filling apparatus for filling containers with a fluid product.

BRIEF DESCRIPTION OF THE PRIOR ART

Pressure-filling apparatuses are known comprising a rotating carousel supporting a plurality of filling heads.

The filling head delivers the fluid product having a low temperature, i.e. ambient temperature.

A first type of pressure-filling apparatus comprises a tank, filling heads which are fixed to the carousel and moving devices which move the container towards and away from the filling heads.

A second type of pressure-filling apparatuses comprises a tank, supporting devices fixed to the carousel, which support the containers, and filling heads having a body fixed to the carousel and a pouring spout comprising sealing elements which move towards and away from the containers. The sealing elements are movable between an operating position in which the sealing elements contact a mouth of a container, that surrounds its neck, so that a fluid product may be inserted into the container, and a rest position, in which the sealing elements are separated from the mouth so that a filled container may be removed from the supporting devices and a further container to be filled may be positioned on the supporting devices.

A drawback of the aforementioned filling apparatuses is that the pouring spout is rather complicated, in particular the pneumatic driving device supplying an operating fluid which moves the sealing elements from the operating position to the rest position, and vice versa, has to be provided.

Filling apparatuses are also known which deliver a fluid product to containers without applying pressure to the fluid product.

Such filling apparatuses deliver a hot fluid product, having a temperature of about 85° C.

These filling apparatuses comprises a carousel supporting a tank and movable filling heads which move towards and away from containers held by holding devices.

Flexible pipes, for example made of plastics, are interposed between the tank and the filling heads, which do not disturb the movement of the filling heads.

The high temperature of the fluid product prevents bacterial charges from originating in the curved parts of the flexible pipes.

The flexible pipes, therefore, may not be used in pressure-filling apparatuses which deliver a fluid product having a low temperature, i.e. ambient temperature, since at a low temperature bacterial charges is not prevented from originating in the curved parts of the flexible pipes.

SUMMARY OF THE INVENTION

An object of the invention is to improve known filling apparatuses.

Another object of the invention is to obtain a filling apparatus, having a movable filling head, which is simple to be manufactured.

A further object of the invention is to obtain a filling apparatus which delivers a pressurized fluid product at low temperature in highly hygienic conditions.

In a first aspect of the invention, an apparatus for filling a container is provided, comprising a tank for a fluid product to be delivered, a filling head for delivering the fluid product to said container, the filling head being movable towards and away from the container, a connecting means arrangement interposed between the tank and the filling head for supplying the fluid product to the filling head, wherein the connecting arrangement comprises at least a ball-and-socket joint structure.

Owing to this aspect of the invention, a filling apparatus is obtained which is very simple to be manufactured, since the whole filling head is moved, and not only a sealing element thereof, as in some prior-art apparatuses. A pneumatic driving device includes complex delivery devices for supplying an operative fluid up to a pouring spout of the filling head that sealing elements of the filling head are no longer required.

In addition, the filling apparatus according to this aspect of the invention is very hygienic, since no curved part is provided in the ball-and-socket joint structure, in which bacterial charges may originate. The filling apparatus according to this aspect of the invention, therefore, may be used for delivering a pressurized fluid product at a low temperature.

In a second aspect of the invention, a ball-and-socket joint structure is provided, comprising a first tubular element including spherical body and second tubular element comprising spherical cavity, wherein it further comprises a tubular sealing element arranged inside the first tubular element and the second tubular element at a zone in which the spherical body and the spherical cavity are mutually engaged.

Owing to this aspect of the invention, it is possible to obtain a ball-and-socket joint structure in which the tubular sealing element prevents leakage of fluid product at a region in which the spherical body and the spherical cavity mutually engage.

The ball-and-socket joint structure according to this aspect of the invention may be mounted on filling apparatuses. The filling apparatuses may operate in a very hygienic way, also at a low temperature, since substantially no curved portion in which bacterial charges may originate is provided.

BRIEF DESCRIPTION OF THE FIGURES

The invention will be better understood and carried into effect with reference to the attached drawings in which some embodiments are shown by way of non-limiting example, in which.

DETAILED DESCRIPTION

Figure 1:
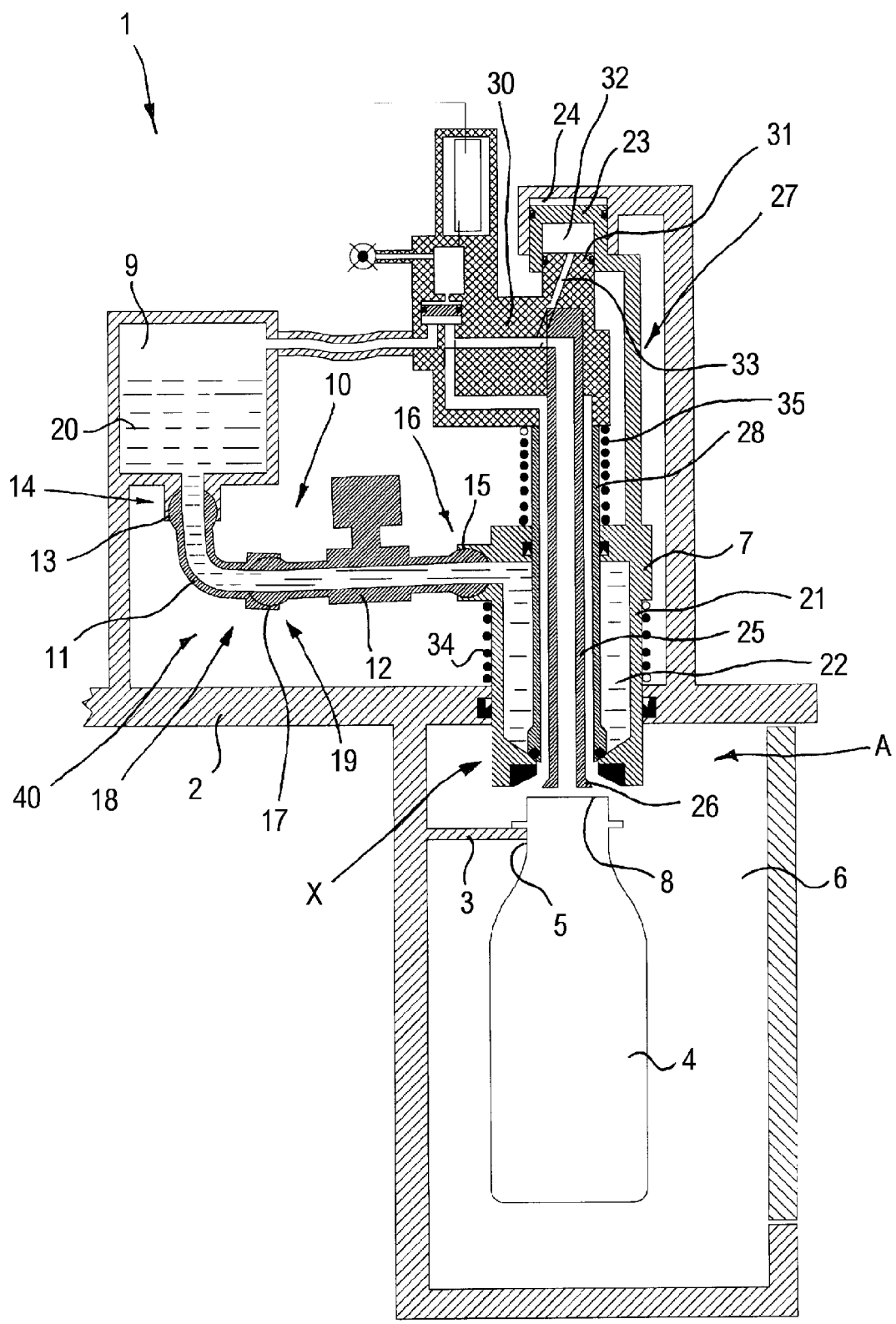
FIG. 1 is a longitudinal section of a filling apparatus in an operating configuration.
Figure 2:
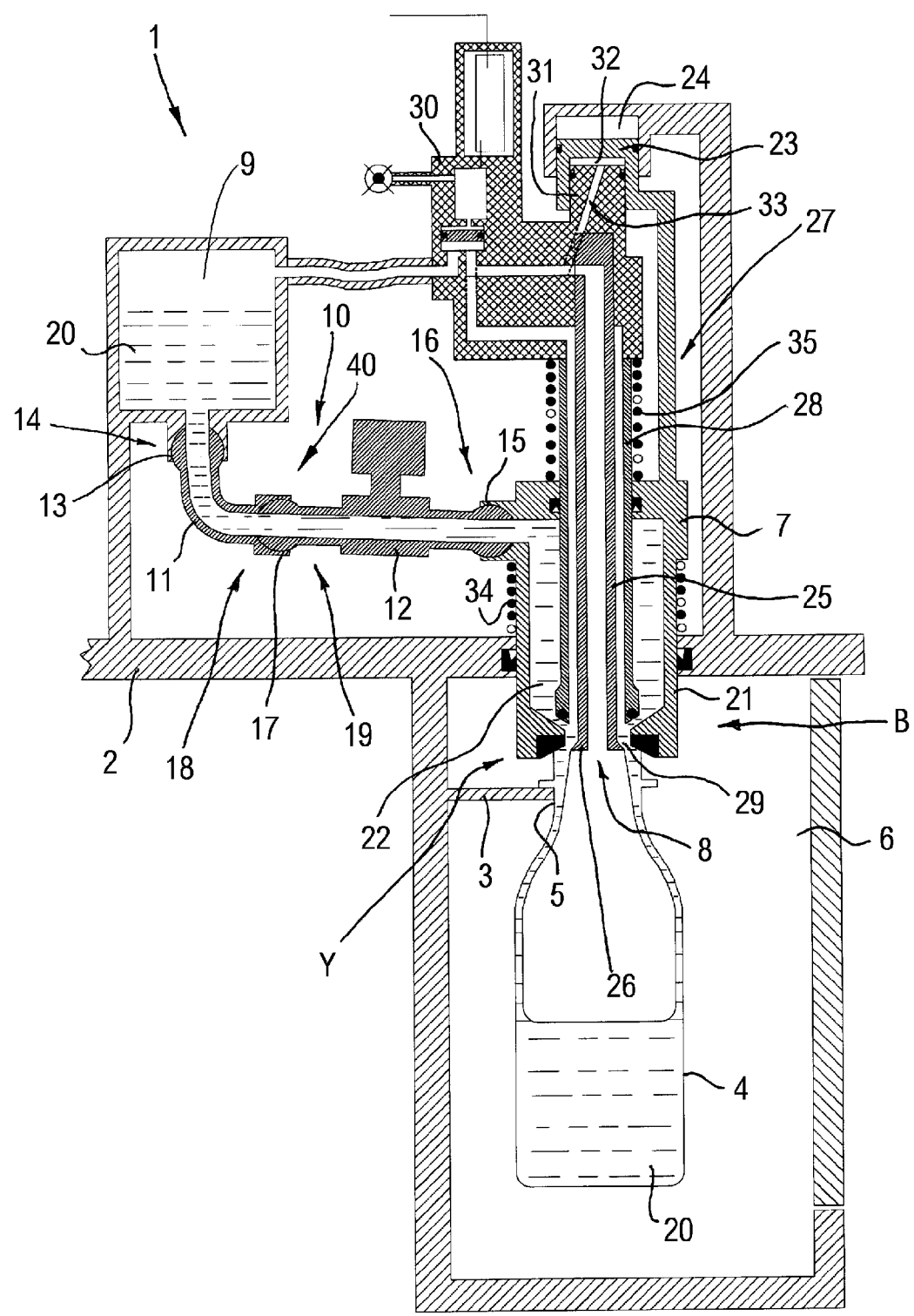
FIG. 2 is a section like that of FIG. 1 which shows the filling apparatus in a further operating configuration.

With reference to FIGS. 1 and 2, a filling apparatus 1 is shown comprising a rotating carousel 2 provided with a plurality of holding devices 3, each holding device 3 being arranged for supporting a container 4 to be filled.

The holding device 3 comprises a curved holding element, fixed to the carousel 2, which partially surrounds the neck 5, including the mouth 8, of the container 4.

The holding device 3 is arranged in an aseptic chamber 6.

The filling apparatus 1 further comprises a plurality of filling heads 7, each filling head 7 being arranged above a corresponding holding device 3.

The filling head 7 is movable, within the aseptic chamber 6, between a rest position A, shown in FIG. 1, in which the filling head 7 is separated from the mouth 8 of the container 4 so that a filled container may be removed from the holding device 3 and an empty container to be filled may be positioned on the holding device 3, and a working position B, shown in FIG. 2, in which the filling head 7 is in contact with the mouth 8 so that a fluid product 20 is poured into the container 4.

The filling apparatus 1 further comprises a tank 9, for example an annular tank, arranged on the carousel 2, each filling head 7 being connected to the tank 9 by connecting means 10.

The filling apparatus 1 further comprises a tank 9, for example an annular tank, arranged on the carousel 2, each filling head 7 being connected to the tank 9 by a connecting arrangement 10.

The filling apparatus 1 further comprises a pressurizing device, not shown, for pressurizing the fluid product 20 in the tank 9 and/or in the filling head 7.

In particular, the filling apparatus may be an isobaric filling apparatus which delivers the fluid product at a pressure up to 5 bar.

The connecting arrangement 10 allows the filling head 7 to move with respect to the tank 9 from the rest position A to the working position B, and vice versa.

The connecting arrangement 10 comprises a first pipe 11, which is curved, and a second pipe 12, which is straight, and a ball-and-socket joint structure 40.

The ball-and-socket joint structure 40 comprises a first ball-and-socket joint 13 defined between the tank 9 and a first end 14 of the first pipe 11, a second ball-and-socket joint 15 defined between the filling head 7 and a further first end 16 of the second pipe 12 and a third ball-and-socket joint 17 defined between a second end 18 of the first pipe 11 and a further second end 19 of the second pipe 12.

The filling head 7 comprises a body 21 provided with a pouring chamber 22 which receives the fluid product 20 from the tank 9 and delivers the fluid product 20 to the container 4.

The body 21 further comprises a driving element 23 under the form of an appendage which is received into a chamber 24 obtained in the carousel 2.

The chamber 24 is connected, by means of a pipe which is not shown, to a source of an operating fluid.

The chamber 24 and the driving element 23 cooperate to define a fluid cylinder.

The filling head 7 further comprises a removing conduit 25 partially received in the pouring chamber 22 which removes gaseous fluids from the container 4 when the container 4 is filled with the fluid product 20.

The removing conduit 25 comprises a removing end 26 which is received into the mouth 8, when the filling head 7 is in the working position B.

The filling head 7 further comprises a valve 27 comprising a shutter element 28 having a tubular shape. The shutter element 28 is interposed between the pouring chamber 22 and the removing conduit 25.

The valve 27 comprises a further body 30 to which both the shutter element 28 and the removing conduit 25 are fixed.

Figure 3:
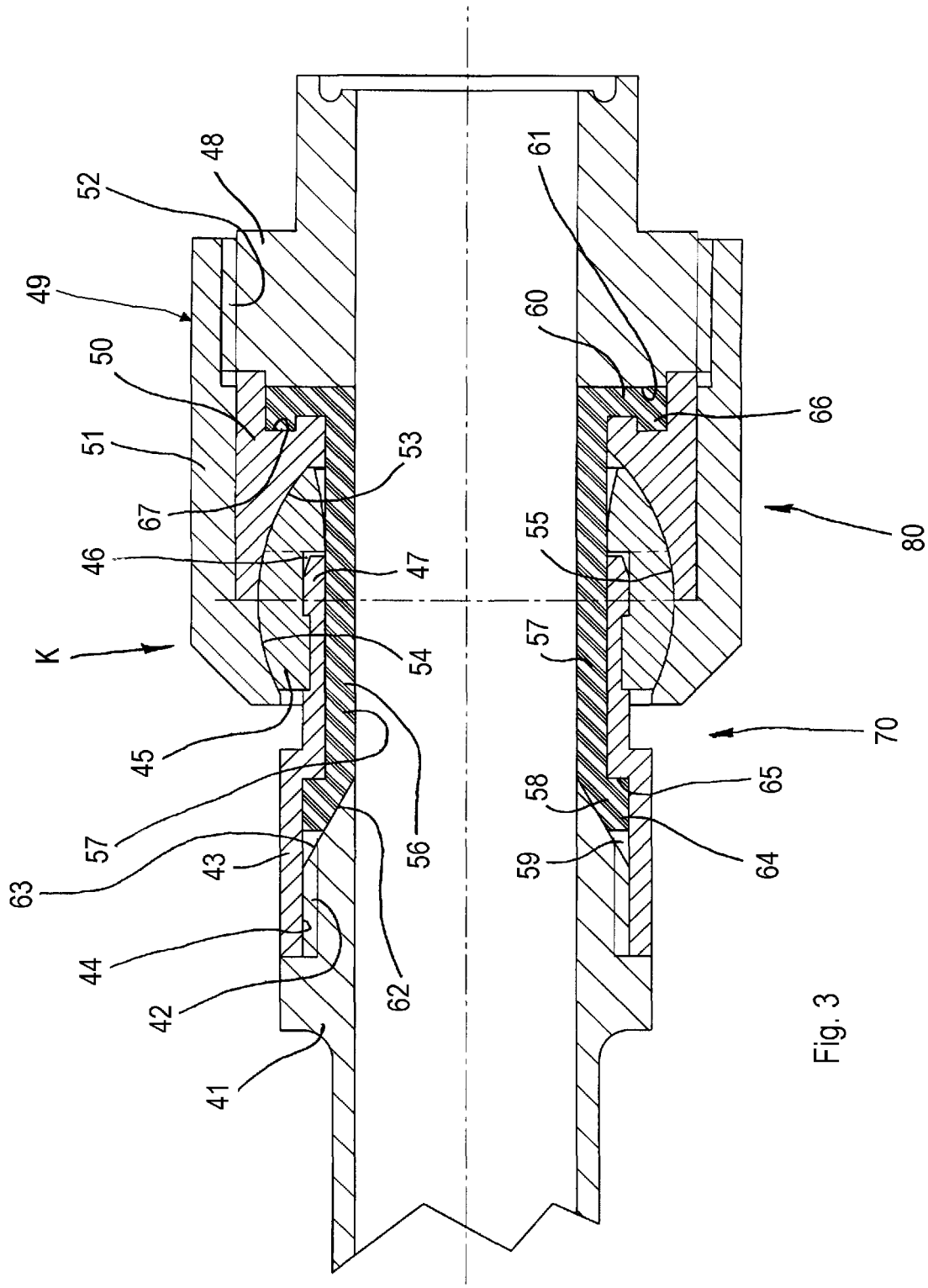
FIG. 3 is a longitudinal section of a ball-and-socket joint structure according to the invention.

The valve 27 is movable between a closing position X, shown in FIG. 1, in which the shutter element 28 abuts against the body 21 and closes a pouring opening 29 of the pouring chamber 22, and an opening position Y, shown in FIG. 3, in which the shutter element 28 is spaced apart from the body 21 and the fluid product 20 may flow through the pouring opening 29.

The further body 30 comprises a further driving element 31, also under the form of an appendage which is received into a further chamber 32 obtained in the appendage constituting the above mentioned driving element 23.

The further chamber 32 is connected to a source of an operating fluid by means of a pipe 33.

The further chamber 32 and the further driving element 31 cooperate to define a fluid cylinder.

In use, when the operating fluid fills the chamber 24, the appendage constituting the driving element 23 slides within the chamber 24 so that the filling head 7 moves against the action of an elastic element 34 interposed between the carousel 2 and the body 21 from the rest position A to the working position B.

While the filling head 7 moves from the rest position A to the working position B, the valve 27 is maintained in the closing position X.

Successively, when the filling head 7 is in the working position B, the operating fluid fills the further chamber 32 and the further driving element 31 slides within the further chamber 32 so that the filling head 7 moves against the action of a further elastic element 35 interposed between the body 21 and the further body 30 from the closing position X to the opening position Y.

The ball-and-socket joint structure 40 comprises a first tubular member 41 having a first threaded portion 42 and a tubular appendage 43 having a second threaded portion 44.

The first threaded portion 42 engages with the second threaded portion 44 so that the first tubular member 41 is connected to the tubular appendage 43.

The ball-and-socket joint structure 40 further comprises a spherical body 45 internally provided with a groove 46 in which a rim 47 of the tubular appendage 43 is received so that the spherical body 45 is firmly connected to the tubular appendage 43.

The first tubular member 41, the tubular appendage 43 and the spherical body 45 cooperate to define a first tubular portion 70.

The ball-and-socket joint structure 40 comprises a second tubular member 48 and an intermediate element 50 which are interconnected by means of a fixing structure 49.

The fixing structure 49 comprises a ring nut 51 which is screwed on a thread 52 of the second tubular member 48.

The second tubular member 48, the ring nut 51 and the intermediate element 50 cooperate to define a second tubular portion 80.

The intermediate element 50 comprises a portion of spherical cavity 53 and the ring nut 51 comprises a further portion of spherical cavity 54, the portion of spherical cavity 53 and the further portion of spherical cavity 54 cooperating to define a spherical cavity 55 arranged for shapingly coupling with the spherical body 45.

The ball-and-socket joint structure 40 further comprises a tubular sealing element 56 comprising a central portion 57, an end portion 58 received in a seat 59 defined between the first tubular member 41 and the tubular appendage 43 and a further end portion 60 received in a further seat 61 defined between the second tubular member 48 and the intermediate element 50.

The tubular sealing element 56 may be made of plastics, for example of elastomeric material such as silicone rubber.

The end portion 58 comprises an inclined face 62 which couples with a corresponding further inclined face 63 of the first tubular member 41.

The end portion 58 further comprises an annular element 64 interacting with an abutting surface 65 of the tubular appendage 43.

The further end portion 60 comprises an annular projection 66 received in a corresponding annular groove 67 of the intermediate element 50.

The tubular sealing element 56 prevents leakage of the fluid product 20 at the region K in which the spherical body 45 and the spherical cavity 55 mutually engage.

The invention claimed is:

1. An apparatus for filling a container, comprising:
   at least one tank for a fluid product to be delivered;
   one filling head for delivering said fluid product to said container, said filling head being movable towards and away from said container;
   a connecting arrangement interposed between said tank and said filling head for supplying said fluid product to said filling head, said connecting arrangement comprising a ball-and-socket joint structure, said ball-and-socket joint structure comprising a first tubular portion comprising a spherical body and a second tubular portion comprising a spherical cavity, a tubular sealing element being arranged inside said first tubular portion and said second tubular portion at a zone in which said spherical body and said spherical cavity are mutually engaged, said tubular sealing element comprising a central portion, an end portion received in a seat of said first tubular portion and a further end portion received in a further seat of said second tubular portion.

2. The apparatus of claim 1, wherein said connecting arrangement comprises a first pipe and a second pipe and said ball-and-socket joint structure comprises a first ball-and-socket joint defined between said tank and a first end of said first pipe, a second ball-and-socket joint defined between said filling head and a further first end of said second pipe and a third ball-and-socket joint defined between a second end of said first pipe and a further second end of said second pipe.

3. The apparatus of claim 2, wherein said first pipe is a curved pipe and said second pipe is a straight pipe.

4. The apparatus of claim 1, wherein said tubular sealing element is made of plastics.

5. The apparatus of claim 1, wherein said tubular sealing element is made of elastomeric material.

6. The apparatus of claim 1, wherein said first tubular portion comprises a first tubular member and a tubular appendage mutually connected, said spherical body being associated with said tubular appendage.

7. The apparatus of claim 6, wherein said first tubular member comprises a first threaded portion and said tubular appendage comprises a second threaded portion which engages with said first threaded portion.

8. The apparatus of claim 6, wherein said spherical body is internally provided with a groove in which a rim of said tubular appendage is received.

9. The apparatus of claim 1, wherein said second tubular portion comprises a second tubular member and a fixing structure mutually connectable, and an intermediate element interposed between said second tubular member and said fixing structure.

10. The apparatus of claim 9, wherein said fixing structure comprises a ring nut screwed on a thread of said second tubular member.

11. The apparatus of claim 9, wherein said fixing structure and said intermediate element define said spherical cavity.

12. The apparatus of claim 9, wherein said spherical cavity is defined by a first portion of spherical cavity arranged in said intermediate element and a further portion of spherical cavity arranged in said fixing structure.

13. The apparatus of claim 1, wherein said first tubular portion comprises a first tubular member and a tubular appendage mutually connected, said spherical body being associated with said tubular appendage and wherein said seat is defined between said first tubular member and said tubular appendage.

14. The apparatus of claim 13, wherein said end portion comprises an inclined face which couples with a corresponding further inclined face of said first tubular member.

15. The apparatus of claim 13, wherein said end portion further comprises an annular element interacting with an abutting surface of said tubular appendage.

16. The apparatus of claim 1, wherein said second tubular portion comprises a second tubular member and a fixing structure mutually connectable, and an intermediate element interposed between said second tubular member and said fixing structure and wherein said further seat is defined between said second tubular member and said intermediate element.

17. The apparatus of claim 16, wherein said further end portion comprises an annular projection received in a corresponding annular groove of said intermediate element.

18. The apparatus of claim 1, wherein said filling head comprises a pouring chamber which receives said fluid product from said tank and delivers said fluid product to said container and a driving element slidable in a chamber, said chamber being connected to a source of an operating fluid.

19. The apparatus of claim 18, wherein said chamber is arranged on a carousel which supports said tank and said filling head.

20. The apparatus of claim 19, wherein said chamber is fixed to said carousel.

21. The apparatus of claim 17, wherein said chamber and said driving element cooperate to define a fluid cylinder which moves said pouring chamber between a rest position, in which said pouring chamber is spaced apart from a mouth of said container, and a working position, in which said pouring chamber interacts with said mouth.

22. The apparatus of claim 18, wherein said filling head further comprises a valve provided with a shutter element.

23. The apparatus of claim 22, wherein said valve comprises a further fluid cylinder which moves said shutter element between a closing position, in which said shutter element closes a pouring opening of said pouring chamber, and an opening position, in which said shutter element is spaced apart from said pouring opening.

24. The apparatus of claim 23, wherein said further fluid cylinder comprises a further driving element connected to said shutter element and slidable in a further chamber, said further chamber being connected to a source of an operating fluid.

25. The apparatus of claim 24, wherein said further chamber is obtained in said driving element.

* * * * *